Figure 1:
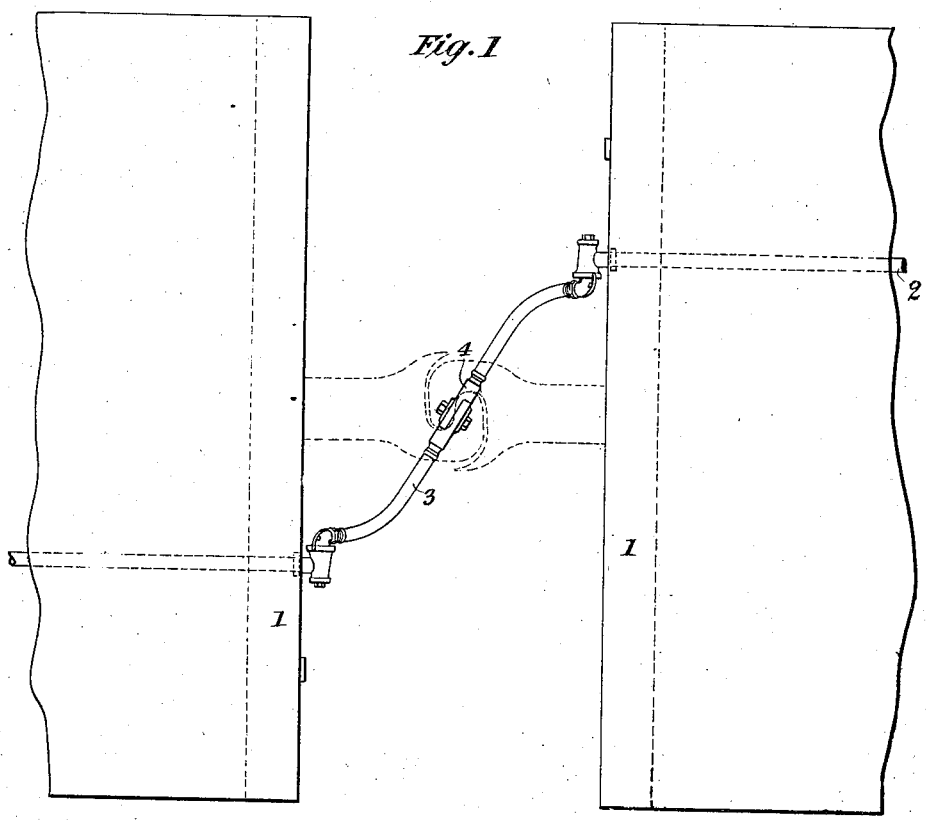

(No Model.) 3 Sheets—Sheet 1.

E. G. SHORTT.
ANGLE COCK AND SUPPORT FOR TRAIN PIPE COUPLINGS.

No. 547,688. Patented Oct. 8, 1895.

Witnesses:
Raphaël Netter
Robt. F. Gaylord

Inventor
Edward G. Shortt
by Duncan & Page
Attorneys (No Model.)  3 Sheets—Sheet 2.
E. G. SHORTT.
ANGLE COCK AND SUPPORT FOR TRAIN PIPE COUPLINGS.
No. 547,688. Patented Oct. 8, 1895.
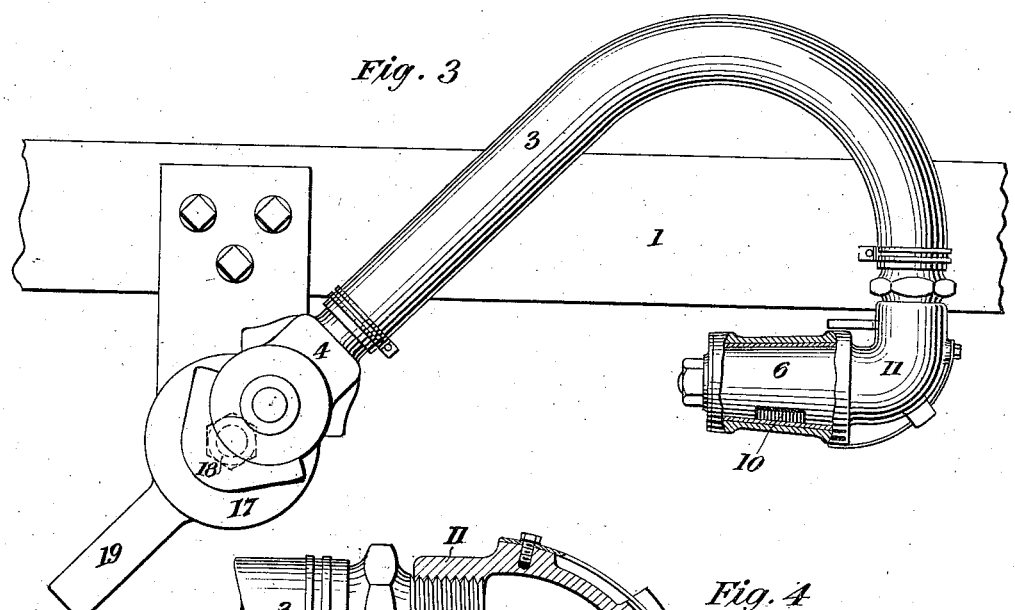
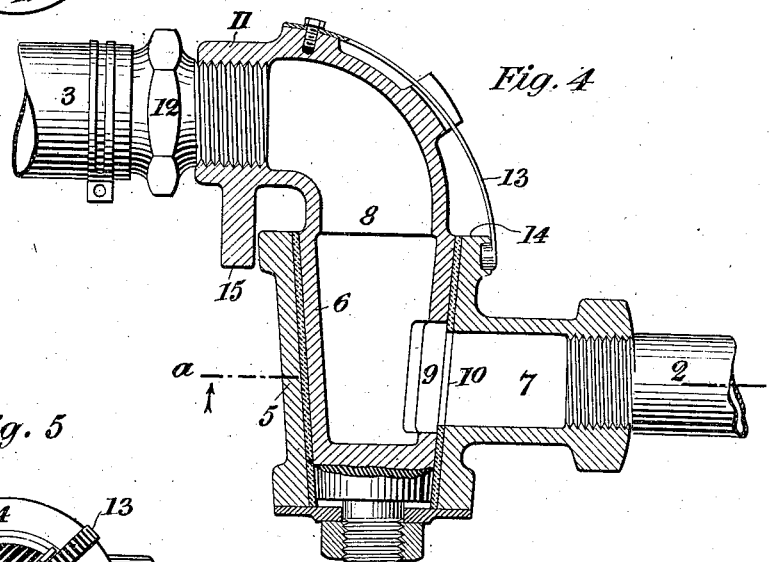
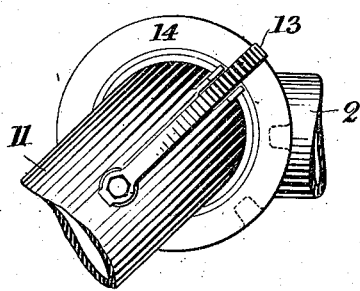
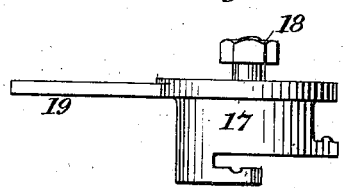
Witnesses:
Raphael Netter
Robt. F. Taylord
Inventor
Edward G Shortt
by Duncan & Page
Attorneys.

(No Model.)

E. G. SHORTT.
ANGLE COCK AND SUPPORT FOR TRAIN PIPE COUPLINGS.

No. 547,688.

3 Sheets—Sheet 3.

Patented Oct. 8, 1895.

Witnesses:
Raphaël Netter
Robt. F. Gaylord

Inventor
Edward G Shortt
by Duncan & Page
Attorneys

United States Patent Office.

EDWARD G. SHORTT, OF CARTHAGE, ASSIGNOR TO CHARLES GOODWIN EMERY, TRUSTEE, OF NEW YORK, N. Y.

ANGLE-COCK AND SUPPORT FOR TRAIN-PIPE COUPLINGS.

SPECIFICATION forming part of Letters Patent No. 547,688, dated October 8, 1895.

Application filed November 20, 1894. Serial No. 529,367. (No model.)

*To all whom it may concern:*

Be it known that I, EDWARD G. SHORTT, a citizen of the United States, residing at Carthage, in the county of Jefferson, in the State of New York, have invented certain new and useful Improvements in Air-Brake Train-Pipe Coupling Mechanism, of which the following is a specification, reference being had to the drawings accompanying and forming a part of the same.

This invention relates generally to coupling mechanism for operatively connecting and controlling the car train-pipes or car train-pipe sections of an air-brake mechanism, especially an automatic air-brake mechanism, when the cars are coupled together to form a train, and to mechanism for controlling the coupling parts of the train-pipe sections when the same are not in coupling position. By automatic air-brake mechanism is meant an air-brake mechanism which is brought into braking operation by opening the train-pipe and exhausting therefrom the air held therein under pressure. In the use of an automatic air-brake mechanism it is essential that the passage of the train-pipe thereof be positively held continuous from car to car of the train, so as to insure the brake mechanism of each of the cars being held in operative condition; also, it is desirable that the coupling devices between the cars be such that when two cars are purposely disconnected the proper action of uncoupling the sections of car train-pipe will insure such sections being left closed; also, when two coupled cars are accidentally or improperly separated that the train-pipe upon being opened shall be so left to insure the application of the brakes on the two sections of the train and hold the brake mechanism further inoperative until the train-pipe has been properly closed; also, it is desirable to support the coupling-pipes of separate cars in such manner that when they are in uncoupled position the train-pipe will be held closed and the coupling parts thereof be protected against injury.

The present invention consists, in general, of a valve mechanism connecting a car-section of train-pipe to its coupling-pipe and positively actuated by the coupling-pipe, so that when the coupling end of the coupling-pipe is coupled to another like section, or is unsupported, as by the pipe being left hanging from the valve mechanism, the train-pipe passage will be open to the coupling-pipe, and when said coupling end is uncoupled and brought to a particular position of support, as the hang-up position of the coupling-pipe, the train-pipe passage will be held closed.

Figure 2:
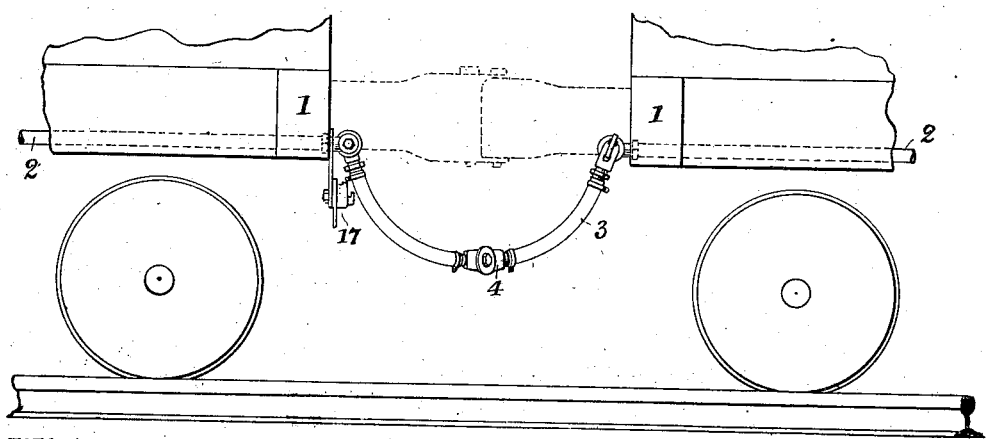
Figure 7:
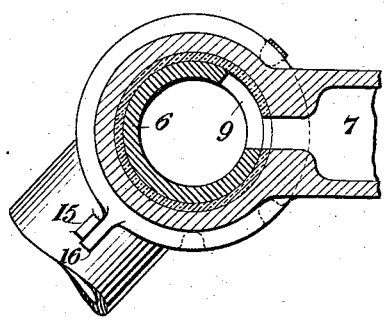
Figure 8:
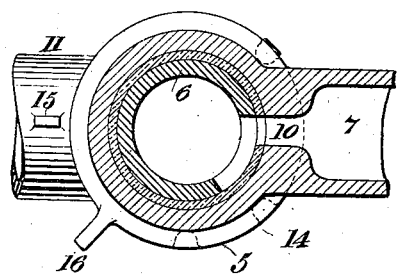
Figure 9:
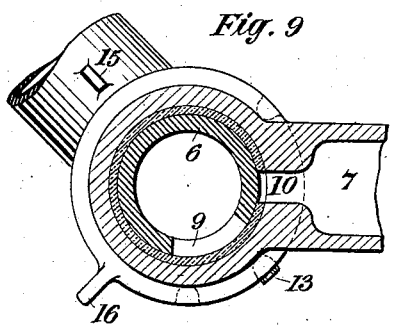
Figure 10:
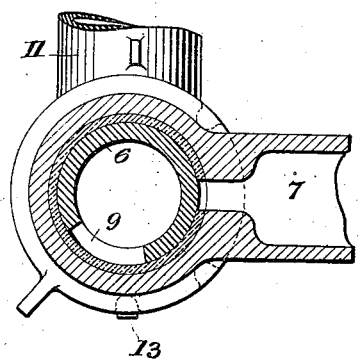

In the drawings, Figure 1 is a plan view looking upwardly or from the ground of the platforms of two cars coupled together in running position, this figure also showing the ends of two car-sections of an air-brake train-pipe and the coupling-pipes of the same in coupled or running position, in which position the valves connecting the pipes and sections are turned to open the train-pipe passage from one car to the other. Fig. 2 is a side elevation of the same. Fig. 3 is an enlarged end elevation of one car-platform, showing the coupling end of one of the coupling-pipes in hung-up or supported position, in which position the train-pipe valve operated by this coupling-pipe is turned to close the train-pipe passage. Fig. 4 shows an enlarged central section of the train-pipe valve in running or open position. Fig. 5 is a side elevation view looking downwardly on the same from above Fig. 4 and on the same scale as that figure. Fig. 6 is an edge view of the coupling-pipe hook or hanger or dummy-coupling. Fig. 7 is a cross-section on plane *a a* of Fig. 4, showing the parts in "running" or open position. Fig. 8 is a like view showing the parts in "breakaway" position, open position being maintained. Fig. 9 shows the uncoupling or "on-lap," also closed position. Fig. 10 shows the "hang-up," also closed position.

Referring to the views of the drawings in detail, 1 represents the truck-beam or general framework of the truck or other part of the car, to which is fixed the rigid car-section of train-pipe 2.

3 is one of the coupling-pipes, usually a flexible or hose pipe, 4 being one of the duplicate coupling halves carried on the end of this pipe and by which the coupling-pipe of one car is united in open communication with the pipe of an adjacent car.

5 (see Fig. 4) is the valve-casing of the train-pipe valve 6, which casing is secured to the rigid train-pipe 2 by the threaded neck 7. The valve 6 is of conical or plug form, though it may be of other construction. It is hollow or axially pierced by the passage 8 and is laterally pierced by the radial passage 9 of extent adapting it to openly register with the train-pipe port 10 when the coupling-pipe and the valve are in running position (as well as when the pipe is hanging uncoupled) and when the valve is in breakaway position. This valve is provided with the coupling-neck 11, through which extends the passage 8, and to this neck is screwed the nipple 12, fixed to the coupling-pipe 3. To this neck 11 is secured a position-indicating and valve-retaining spring 13, the free end of which rides over the notched flange 14 and thereby indicates various positions of the valve as well as tends to hold the valve at any one of such positions. A lug 15 on the neck is in plane with stop 16 on the flange, whereby the plug is held open to the train-pipe when the coupling-pipe is in coupled or running position or its coupling end is hanging or in unsupported position.

17 indicates the coupling-pipe hook or dummy-coupling, which, so far as concerns its engagement with the coupling-pipe, is of common form. Usually such hook or dummy consists of a blank coupling, substantially the same in general form as one of the couplings 4, but without the usual open passage through the same, and it is flexibly hung from the car and is adapted to couple with either of the couplings 4, and so as to cover the train-pipe opening in the same to prevent the ingress of dust or other foreign material. This common form of dummy-coupling or coupling-pipe support acts imperfectly, by reason of the movement of the car, to properly hold the train-pipe passage through the coupling closed. To remedy this I support my hook on a fixed pivot-bolt 18 and provide the hook with a weight, such as the gravity handle 19, by which the hook can be manipulated to engage or disengage the coupling of the coupling-hose, and which acts in engaging position, under influence of gravity, to hold the hook tightly closed upon the coupling-pipe or its coupling.

The various operations of this valve will now be understood. Assuming the couplings of the coupling-pipes of two cars to be openly joined in running position, the position of the train-pipe valves will be as seen in Fig. 7—that is, the manipulation of the coupling-pipes in joining the couplings will open the train-pipe valves and put the car-sections of the train-pipe to full communication. While the coupling-pipes are thus held in running position, the valves are positively held against being closed, and it is insured that the disconnection, operatively, of one part of the brake system of the train from another part thereof will not occur, as is now a possible occurrence with the common coupling devices, as by the intentional turning of the common angle-cock, or by neglect to open the same when the cars are coupled together. If parts of the train break away from each other, the coupling-pipes between the adjacent and parting cars will be drawn out horizontally to breakaway position, as shown in Fig. 8, and upon the couplings separating or the train-pipe being otherwise opened by the separation of the cars the valve of each train-pipe section will be left in position holding the pipe open, and so will cause the brakes to go on. Upon purposely disconnecting the coupling-pipes the trainman should lift the two joined coupling-pipes until the train-pipe valves are turned to on-lap or closed position of the valves, which position will be indicated when the spring 13 of each valve falls into the middle notch of the flange 14. Then the couplings may be separated without operatively opening either train-pipe section. When the couplings have been disconnected, it is the duty of the trainman to swing or turn each of the coupling-pipes upwardly or laterally to hang-up position, as seen in Fig. 3, or to any place resulting in the closed position of its train-pipe valve, and to put the pipe or its coupling to locking engagement with its hang-up hook or dummy coupling. While one coupling-pipe is being hung up, the other may be left suspended at on-lap position, if carefully left at such position, the indicator-spring being sufficiently resistant to prevent the valve being turned to open position by the weight alone of the pipe when the cars are not moving. If either coupling-pipe when uncoupled be permitted to drop to running position, the train-pipe valve will be opened and the hanging condition of the coupling-pipe will be indicated by the brakes going on. Similarly, if either pipe be left at on-lap position, it will fall to running position upon the car moving and set the brakes, it being the intention that on-lap position shall only be availed of while the trainman uncouples and is hanging up the separated coupling-pipes or has unhung the pipes preparatory to coupling the same in running position. In coupling the pipes of separate cars together the couplings are brought together while the coupling-pipes and their valves are in on-lap position, and when the coupling-pipes drop to running position the couplings are tightly locked, and the turning of the valves effects the desired communication of the joined train-pipe sections. By thus attaching one of the parts of the train-pipe valve mechanism to the rigid section of train-pipe carried on the car, and by attaching the other relatively movable part of said mechanism to the coupling-pipe, I am enabled to use the coupling-pipe as a lever to readily and certainly operate and control the valve, which, by reason of the usual train-pipe pressure of air, is necessarily strongly seated and so difficult of hand manipulation. Further, as the coupling-pipe is hung on the valve and which acts as a pivot therefor, and particularly when such pipe is as usual a flexible hose, the necessary manipulation thereof is easily made and without the common injuries to such flexible pipe when fixedly attached to the car train-pipe (instead of pivotally as by the present train-pipe valve) resulting from bending and twisting the same on itself.

What is claimed as new is—

1. The combination of an automatic air-brake train-pipe section adapted to be rigidly supported as on a car, a valve mechanism one of the relatively movable parts of which is fixed to said rigid section, a coupling pipe attached to and for operating the other part of said valve mechanism and adapted to connect the same to another train pipe section, said valve being operated by said coupling pipe to hold the train-pipe open to the coupling pipe when the coupling end of the latter is coupled to another car train-pipe and when said coupling end is uncoupled and in hanging or unsupported position, and also to hold the train-pipe closed when said coupling end is uncoupled and held supported.

2. The combination of a rigid car train-pipe section of an automatic air brake mechanism, a valve mechanism one of the relatively movable parts of which is fixed to said rigid section, a coupling pipe attached to and for operating the other part of said valve mechanism and for connecting the same to another train-pipe section, said coupling pipe operating said valve to hold the train-pipe open to the coupling pipe when the coupling end of the latter is coupled to another car section and when said coupling end is uncoupled and in hanging or unsupported position, and also to hold the train-pipe closed when said coupling end is uncoupled and hung up, and a hook or dummy coupling for holding the coupling pipe in hung up position.

3. In combination with an air-brake train-pipe section, a coupling and coupling pipe attached to the train-pipe by a valve mechanism controlling the train-pipe passage, a pivotally supported hanger or dummy coupling operable to engage the coupling of the coupling pipe and to hold the same closed, and a handle or weight attached to said hanger and acting by gravity to hold said hanger in engagement with the coupling.

4. In combination with a rigid air-brake train-pipe section and its coupling pipe, a valve mechanism connecting the pipes and controlling the train-pipe passage and operated by the coupling pipe, and a valve-retaining device acting upon the movable part of said valve to hold the same and the coupling pipe temporarily in on-lap or closed position, for the purpose set forth.

EDWARD G. SHORTT.

Witnesses:
ROBT. F. GAYLORD,
JOHN UNSER.